United States Patent [19]

Boioli et al.

[11] Patent Number: 4,851,996
[45] Date of Patent: Jul. 25, 1989

[54] COMMON RESOURCE ARBITRATION CIRCUIT HAVING ASYNCHRONOUS ACCESS REQUESTS AND TIMING SIGNAL USED AS CLOCK INPUT TO REGISTER AND MASK SIGNAL TO PRIORITY NETWORK

[75] Inventors: Roberto Boioli, Busto Garolfo; Pierluigi Tagliabue, Milan, both of Italy

[73] Assignee: BULL HN Information Systems Italia, S.p.A., Milan, Italy

[21] Appl. No.: 122,872

[22] Filed: Nov. 19, 1987

[30] Foreign Application Priority Data

Dec. 12, 1986 [IT] Italy ................. 22653 A/86

[51] Int. Cl.[4] ............... G06F 9/46; G06F 13/14; G06F 13/16; G06F 13/20
[52] U.S. Cl. .................................................. 364/200
[58] Field of Search ... 364/200 MS File, 900 MS File

[56] References Cited

U.S. PATENT DOCUMENTS

| 4,339,808 | 7/1982 | North | 364/900 |
| 4,404,628 | 9/1983 | Angelo | 364/200 |
| 4,449,183 | 5/1984 | Flahive et al. | 364/200 |
| 4,597,054 | 6/1986 | Lockwood et al. | 364/900 |
| 4,611,297 | 9/1986 | Dudley | 364/900 |
| 4,644,461 | 2/1987 | Jenning | 364/200 |

OTHER PUBLICATIONS

"Arbitration Logic", IBM Technical Disclosure Bulletin, vol. 28, No. 9, Feb. 1986.

Primary Examiner—Archie E. Williams, Jr.
Assistant Examiner—Emily Y. Chan
Attorney, Agent, or Firm—Gary Clapp; John S. Solakian; Lewis P. Elbinger

[57] ABSTRACT

Arbitration circuit operates for common bus access granting where the asynchronous access requests are latched in a register by the rising edge of a periodical square wave timing signal, and from there transferred to a logical priority network, implemented with a programmable logic array.

3 Claims, 2 Drawing Sheets

COMMON RESOURCE ARBITRATION CIRCUIT HAVING ASYNCHRONOUS ACCESS REQUESTS AND TIMING SIGNAL USED AS CLOCK INPUT TO REGISTER AND MASK SIGNAL TO PRIORITY NETWORK

BACKGROUND OF THE INVENTION

Scope of the Invention

The present invention relates to data processing systems and more particularly to an arbitration circuit for granting access to common resources, coupled in common to a system bus.

DESCRIPTION OF THE PRIOR ART

It is known that in current data processing systems several intelligent functional units are connected to each other and to common resources, such as a working memory, by means of a common communication bus. Each of the units may compete for the bus to place address, data and command signals in competition with each other. In order to avoid simultaneous access to the common resource by more than one unit, access arbitration logic is used. The arbitration logic grants permission to one of several requesting units to access the common resource according to suitable priority criteria and, if required, in compliance with pre-established "communication protocols". Several embodiments of arbitration logic are known, which make use of logical networks built up with discrete logic components which perform elementary logic functions or with integrated circuits which perform all the required functions, but are very expensive.

With the advent of programmable array logic (PAL) integrated circuits, it has been proposed to implement such arbitration circuits with the new available tools, thus reducing the cost of the arbitration circuits so implemented. A fundamental problem which must be solved in the implementation of arbitration circuits with parallel priority resolution is the synchonization of the several access requests to the common resources. The several units which need to get access to common resources generate their access requests asynchronously. Such requests, if directly conveyed in a priority logic network, could give rise to spurious transient output signals, which must be avoided.

For this purpose, the use of registers for latching the several access requests, which are strobed periodically by a clock signal to select the requests at a given time, does not suffice. In fact, if the input signal to the latching registers is changing in the time interval which immediately precedes the latching of the register; that is, during the so-called "set up time", the registers may be in an unstable state, with oscillations of the output signal. Such oscillations may theoretically last indefinitely even if they ultimately give rise to a stable state once a time interval has elapsed equal to 2 times the so-called "TPD" (or propagation delay) of the latching component. Therefore the latching of the asynchronous requests is performed by means of two registers, cascade connected and triggered by a periodic clock signal. A first clock signal may latch several requests in the first register and then they are latched in the second register with a second clock signal. The time interval between the first clock signal and the second clock signal must be equal at minimum to 2 tpd+2 st2 where tpd is the "time propagation delay" of the first register and st2 is the "set up time" of the second register. The output signals from the second register are inputted to a priority logical network which enables only the highest priority signals present at the input.

The risk of spurious output signals, however, is not completely avoided.

In fact, the second register may exhibit a certain spread of the input signal propagation delay to output from the clock signal, which when added to the signal scattering due to different length connections and to different component circuits, may still give rise to spurious output signals, which ends within the maximum time propagation delay of the priority network. In order to avoid such spurious signals a third latching station is generally used downstream from the priority network.

The third latching station is clocked by a third clock signal. According to this criteria it is possible to design arbitration circuits implemented with PALs providing two latching registers are cascade connected and are used upstream of the PAL implemented priority logic network. In that case, using a PAL would require a latching output register. The present invention provides an arbitration circuit which has the further advantage in that a PAL and one register only is required for synchronization and latching of the requests without the need of further latching registers. Therefore it is simpler in design, less expensive and has an arbitration time less than the prior art circuits.

SUMMARY OF THE INVENTION

The arbitration logic is based on the concept of using a square wave timing signal both as a clocking signal for the latching register, as well as for a gating or masking signal for the inputs of the priority network. This masks the possible transients which may occur at the output of the latching register, thereby enabling the priority network only when the status of the input signals is stable. The timing signal is used as an enabling/masking signal for all inputs of the priority network, so that a latching register downstream of the priority network is not needed and a feedback signal suffices for overriding the priority network output signal when, in the course of a following period of the clock signal, the clock signal would tend to remove it. In addition, the priority network may easily implement all conditions required for compliance with the several communication protocols, without need of further cascade connected circuits.

BRIEF DESCRIPTION OF THE DRAWINGS

These and other features will appear more clearly from the following description of a preferred embodiment of the invention and from the enclosed drawings where.

DESCRIPTION OF A PREFERRED EMBODIMENT

Figure 1:
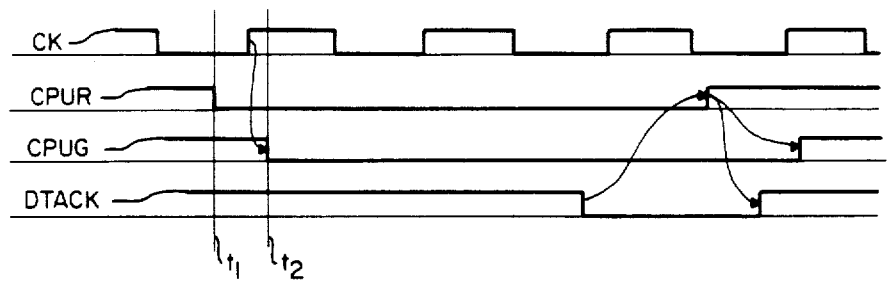
FIG. 1 shows a timing diagram of a first communication protocol, broadly used by central processing units and microprocessors.

FIG. 1 shows a CPUR signal by which a central processing unit (CPU) asserts a system bus access request (for example, in order to communicate with a working memory) by forcing signal CPUR low at time t1.

At time t2, an arbitration circuit, timed by a periodic clock signal CK, grants access to the system bus and to the memory by forcing an answer signal CPUG low. The CPU may perform an information exchange with the memory through the bus. Once the CPU has taken control over the bus, the memory communicates the validity of a data present on the communication bus by forcing signal DTACK low.

This results in the CPU ending the communication cycle by resetting signal CPUR high after a suitable delay of signal DTACK going low.

Figure 2:
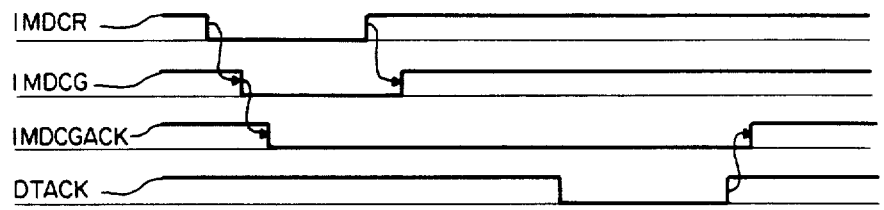
FIG. 2 shows a timing diagram of a second communication protocol, broadly used by peripheral controllers (I/O controller).

In this way the communication cycle between CPU and the memory is ended. The arbitration logic detects the rise of signal CPUR and accordingly forces signal CPUG high to indicate that the bus is no longer available to the CPU. In a similar manner, FIG. 2 shows a second type of communication protocol where a general peripheral controller IMDC requests access to the system bus by forcing a signal IMDCR low at t1 time.

This operation is performed only if the bus is free and available. The bus state is defined by the level of a signal GACK which when high indicates that no peripheral controller is connected to the bus, and which when low indicates that one of the controllers is connected to the bus. The peripheral controller IMDC receives the GACK signal and is enabled to broadcast the bus access request signal IMDCR only if the GACK signal is high. At t2 time defined by a periodic clock signal CK, the arbitration logic detects the request signal IMDCR and grants bus access by forcing a signal IMDCG low.

This signal is received by controller IMDC which takes control over the bus by forcing signal GACK low.

Thereafter the controller IMDC may remove the access request by forcing signal IMDRC high.

Consequently the arbitration logic, in synchronism with the timing signal CK forces signal IMDCG high. However, as long as signal GACK is low, the IMDC controller may put information over the bus or receive information through the bus and the arbitration logic cannot grant bus access to any other unit.

When the information exchange is concluded, controller IMDC forces signal GACK high and makes the bus available.

Figure 3:
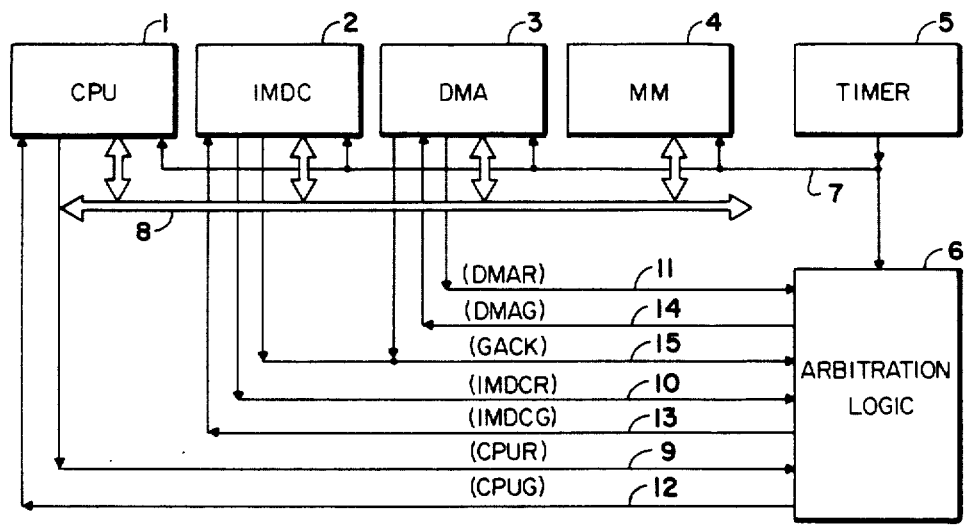
FIG. 3 is a block diagram of a typical electronic data processing system architecture.

FIG. 3 shows a block diagram of a data processing system architecture which makes use of the arbitration logic implemented in accordance with the present invention. The system comprises a central unit (CPU) 1, a peripheral controller (IMDC) 2, a direct memory access unit (DMA) 3, a shared memory 4, a timing unit 5 and an arbitration logic 6. Units 1, 2, 3 and 4 are connected to each other by a bus 8, through which information is exchanged between any two of the units. Timing unit 5 provides units 1, 2, 3 and 4, as well as the arbitration logic 6, with a square wave timing signal CK, having typically a frequency of 20 MHz via lead 7.

This signal is used by the several units to generate suitable timing signals. Units 1, 2 and 3 forward to the arbitration circuit 6, on leads 9, 10, 11 respectively, bus access request signals CPUR, IMDCR, DMAR and receive from arbitration logic 6, on leads 12, 13, 14 respectively, bus grant signals CPUG, IMDCG, DMAG. In addition, units 2 and 3 communicate with the arbitration logic 6, through lead 15 to apply the signal GACK to arbitration logic 6. Signal GACK may be forced low by either of the two units 2 and 3.

Figure 4:
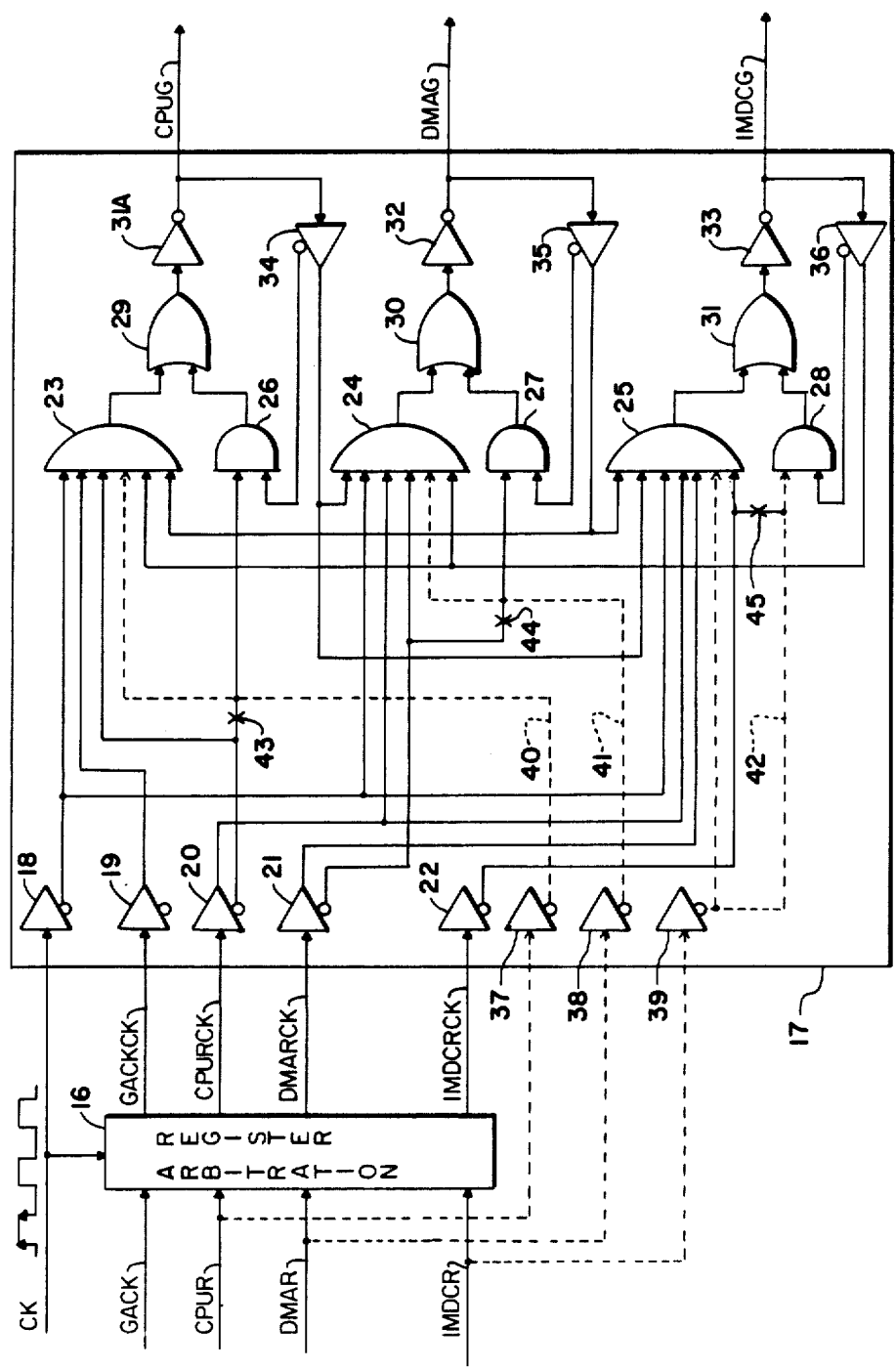
FIG. 4 is a logic diagram of arbitration logic for the system of FIG. 3, implemented in accordance with the present invention.

FIG. 4 shows the logic diagram of the arbitration logic for the architecture of FIG. 3 implemented according to the present invention. The arbitration logic comprises a register 16 and programmable array logic 17, both clocked by a timing signal CK. The programmable array logic 17 is typically of the type Am-PAL16L8, manufactured by Advance Micro Devices Inc., and may be programmed to obtain the connections shown in FIG. 4. PAL 17 comprises a plurality of input receivers 18, 19, 20, 21 and 22 having direct and inverted outputs, a plurality of AND gates 23, 24, 25, 26, 27 and 28 having a number of inputs which depend on the performed programming, a plurality of OR gates 29, 30 and 31 programmed to have two inputs, a plurality of inverting output drivers 31A, 32 and 33 and a plurality of feedback receivers 34, 35 and 36, having inverting and non-inverting outputs. Register 16 receives, as inputs, the signals GACK, CPUR, DMAR, IMDCR and at each rising edge of clock CK latches the state of such signals producing as an output the corresponding signals GACKCK, CPUCK, DMARCK and IMDCRCK. Since the input signals are asynchronous, the logic level of the outputs may oscillate for a certain period of time, but a stable state is reached when, after 25 nsec, clock signal CK (having a frequency of 20 MHz, hence a period of 50 nsec) goes low.

Signals GACKCK, CPURCK, DMARCK and IMDCRCK are inputs to receivers 19, 20 21, and 22 respectively, while signal CK is an input to receiver 18. The detailed logic of the elements of PAL 17 which is shown in FIG. 4 may be described by the following Boolean expression:

NCPUG = CPURCK.NIMDCG.NDMAG.NGACKCK.CK +

CPUG.CPURCK

NDMAG = DMARCK.NCPURCK.NCPUG.NIMDCG.CK +

DMAG.DMARCK

NIMDCG =

IMDCRCK.NCPURCK.NCPUG.NDMAG.NDMARCK.CK +

IMDCG.IMDCRCK (The letter "N", preceding the signal names, indicates the inversion or negation operation.)

In other words the arbitration circuit 17 produces mutually exclusive outputs in signals CPUG (as output from driver 31A), DMAG (as output from driver 32), IMDCG (as output from driver 33), if predetermined conditions are met. From a functional standpoint AND gates 23, 24 and 25, together with inverting receivers 18, 19, 20, 21 and 22 form an arbitration or priority network, periodically enabled by signal CK.

AND gates 23, 24 and 25, together with OR gates 29, 30 and 31, output drivers 31A, 32 and 33 and feedback receivers 34, 35 and 36 form three feedback loops, each for respectively maintaining at the output of network 17, signal CPUG, DMAG, IMDCG (generally XXXG) during the time intervals in which clock signal CK is high and thereby disabling the arbitration logic. Each of the feedback loops is controlled by a signal CPURCK DMARCK and IMDCRCK respectively, (generally XXXRCK) so that the holding function for output signal XXXG is disabled when the request in input XXXRCK which has caused its generation ends. The arbitration network shown in FIG. 4 and formed by AND gates 23, 24, 25 assigns an ordered decreasing priority to signals CPUR, DMAR and IMDCR.

It is, however, clear that depending on the requirements, a different priority order may be established. The described arbitration circuit takes into account the conditions for compliance with both described communication protocols to generate a bus grant signal XXXG, which depends, not only on the established priority, but also on the condition that the bus is effectively free.

This condition is expressed, depending on the case, by signal GACK together with the bus grant signals DMAG and IMDCG going high, if the requesting unit is the CPU 1, or by signals CPUR and GACK going high if the requesting unit is one of the controllers IMDC 2 or DMA3. It is, however, clear that the arbitration circuit may be adapted to perform in compliance with protocols other than the described ones, as well as with protocols which use direct logic instead of inverted logic, as described above. (By direct logic is meant a logic in which logical levels 1 and 0 correspond of electrical levels 1 and 0 respectively.)

It may be noted that while the assertion of signals XXXG is oscilation exempt, the removal of such signals may be affected by oscillation because AND gates 26, 27, 28 are not masked periodically by signal CK.

Therefore the asynchronous removal of the request signal may cause oscillation of the corresponding signals XXXRCK which output from register 16, the oscillations of which propagate down (through AND gates 26, 27, 28) to the output of drivers 31A, 32, 33 and cause the oscillation of signals XXXG.

This does not result in a malfunction because if the phenomenon occurs, it occurs at the end of a bus access cycle in the half period of signal CK during which a new bus access cycle cannot start. The following bus granting cycle is therefore unaffected by such possible oscillation and at the level of the receiving unit a spurious XXXG signal cannot be construed as a new bus grant signal thereby missing a new request.

In fact, once a unit has completed its bus access request, a time interval generally elapses which suffices for the stabilization of signal XXXG by remaining high.

However, if required, even this uncertainty may be overcome by providing the signals from the requesting units through inverting drivers 37, 38 and 39 to the AND gates 23, 24 and 25 respectively. These connections are shown as dotted lines 40, 41 and 42. These signals replace the outputs of drivers 20, 21 and 22 respectively. This is accomplished by removing the crossed lines 43, 44 and 45. This will also prevent oscillations at the output of the drivers 37, 38 and 39.

While the invention has been shown and described with reference to the preferred embodiment thereof, it will be understood by those skilled in the art that the above and other changes in form and detail may be made therein without departing from the spirit and scope of the invention.

What is claimed is:

1. Arbitration circuit for granting common resource (BUS 8, MM4) access to one among a plurality of units (CPU, IMDC, DMA) competing for access to said common resource by means of asynchronous access request signals (CPUR, IMDCR, DMAR) having a predetermined relative priority to each other, comprising:
    a register having inputs for receiving said plurality of asynchronous access request signals, a single clock input receiving a single periodic timing square wave signal, the access request signals present at said inputs being latched into said register at each transition of said timing signal from a first electrical level to a second level,
    a plurality of arbitration logical networks, each one related to one unit of said plurality, each having an output for outputting a related resource grant signal (CPUG, IMDCG, DMAG)
    a plurality of holding logics, each one related to one of said arbitration logical networks and to one of said units, each one having first input connected to the output of the related arbitration logical network and holding and transferring to an output the resource grant signal received as input,
    each of said arbitration logical networks having inputs connected to outputs of said register and to the output of the holding logic related to each of the others of said arbitration logical networks, and generating said related resource grant signal at its output if no other resource grant signals are received as inputs from the output of the holding logics related to all other arbitration logical networks, if an access request signal from the related unit is latched in said register and if no access request signals from other units having higher priority are latched in said register, each of said arbitration logical networks receiving further as input, said single periodic time square wave signal for inhibiting the generation of said related resource grant signal at its output during the half period in which said timing signal is at said second level,
    each of said holding logics, holding and transferring to its output the resource grant signal received as input, in the half period in which said timing signal is at said second level.

2. Arbitration circuit as claimed in claim 1 wherein each of said holding logics has a second input connected to an output of said register for receiving the access request signal form the related unit and latched in said register, each of said holding logics holding and transferring to its output the resource grant signal received as input if said access request signal from the related unit and latched in said register is received at said second input.

3. Arbitration circuit as claimed in claim 1 wherein each of said holding logics has a second input for receiving the access request signal from the related unit, each of said holding logics holding and transferring to its output the resource grant signal received as input if said access request signal from the related unit is received at said second input.

* * * * *